May 12, 1970 A. LEWIS 3,512,087

FREQUENCY MODULATION RECEIVERS FOR DATA TRANSMISSION

Filed Aug. 14, 1967

Inventor
Alan Lewis
By Kemon Palmer, Stewart & Estabrook
Attorney

United States Patent Office 3,512,087

Patented May 12, 1970

3,512,087
FREQUENCY MODULATION RECEIVERS FOR DATA TRANSMISSION

Alan Lewis, Chessington, Surrey, England, assignor to Evershed & Vignoles Limited, a British company Filed Aug. 14, 1967, Ser. No. 660,388
Claims priority, application Great Britain, Aug. 17, 1966, 36,893/66
Int. Cl. H04l 27/14
U.S. Cl. 325—320 4 Claims

ABSTRACT OF THE DISCLOSURE

Frequency discriminating apparatus for use with signals frequency modulated with pulse data includes a counter receiving pulses from a clock pulse generator through a gating circuit. The gating circuit is controlled by the input waveform and by an inhibiting circuit, itself triggered by the input waveform, in such a manner that in a half cycle or cycle of the input waveform counting is inhibited for the minimum duration of the half period of the waveform. This reduces the number of pulses to be counted. The count during the remaining portion of the period indicates whether the incoming waveform is of the mark, centre, or space frequency.

Figures 1, 2:
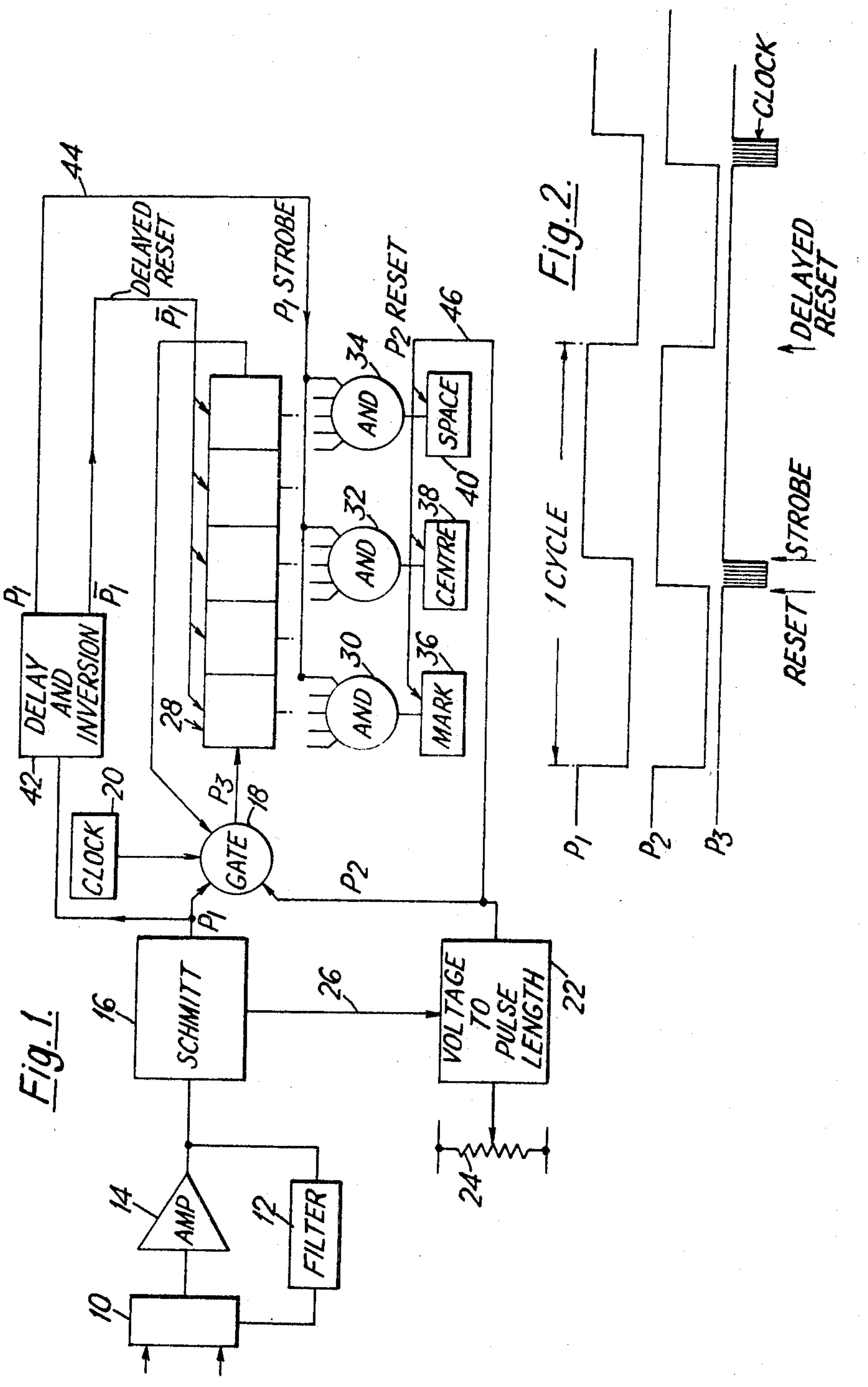

This invention is concerned with the reception of signals frequency modulated with pulsed data and the conversion of such signals back into pulse form. When such signals are transmitted over G.P.O. telephone lines, they must be contained within the normal telephone band width of about 3 kc./s. This band width may be divided up into a number of channels, each channel having a separate carrier and enough band width to pass pulsed information at a reasonable rate. Normally, receivers for such signals are selective to the frequency band of one particular channel. They sense the presence of the carrier for that channel and detect an increase of frequency on the carrier as a mark and a decrease of frequency as a space. This process is normally carried out with the aid of active selective filters, a first filter selecting the channel and a second filter discriminating between the mark and space of that channel. The problems in designing such a discriminator are very great, and the expense correspondingly high, since it may be necessary to detect a frequency change of less than 50 c./s. on a relatively low frequency carrier. The usual technique is to square the incoming waveform, the discriminator filter then extracting the fundamental from the squarewave for each separate side band.

According to the present invention, the receiver has a band-width centred on the carrier frequency of the desired channel, but accommodating side-bands, and the duration of a half cycle or cycle of an input waveform is measured against pulses from a clock generator by means of a counter and a discriminator is preset to indicate a mark frequency, a centre frequency, or a space frequency in accordance with the total count. It is advantageous to reduce the number of pulses to be counted by inhibiting the clock generator for the half-period of the waveform at its minimum duration, that is to say the limit of the upper side band. In this case the number of pulses counted will not directly represent the wave duration but will indirectly represent the duration since it will be equal to the total number of clock pulses generated in the wave duration less the constant number represented by the inhibited period.

Such apparatus enables the frequency discrimination to be made in an extremely simple manner, the counter behaving in effect as a filter, the limits of which are bounded by regions of infinite slope. It thus defines the mark and space side bands with high accuracy. Moreover, although in a frequency division multiplex system, band-pass filters are still necessary to isolate one channel from another, the design of such filters is simplified if they are to be followed by a circuit embodying the present invention and the resulting apparatus is less costly.

In order that the invention may be better understood, one example of a receiver embodying the invention will now be described with reference to the accompanying drawings, in which FIG. 1 is a block diagram of the circuit and FIG. 2 a waveform diagram.

The reception of the centre frequency from the transmitter means that the line is open and ready for the transmission of data. The incoming signal passes through an input isolator 10 followed by an amplifying circuit consisting of an amplifier 14 with a feed-back path 12 having a filter characteristic to prevent amplification of unwanted frequencies outside the normal operating spectrum. However, the filter characteristic does not have to be an accurate definition of the bandwidth of the receiver. In the form shown, the filter characteristic is in the feedback network 12 of the amplifier 14, but it is of course equally possible to have the filter characteristic in the amplifier itself.

The received sine-wave, after amplification, passes into a Schmitt trigger circuit 16 to be squared. The resulting square wave $P_1$ (see also FIG. 2) is then gated in a gate circuit 18 with the pulses from a clock generator 20 so that the number of pulses from the clock generator passed by the gate is representative of the duration of the square wave. As explained above, the gate circuit is inhibited with a signal from an inhibiting device which, in the example shown, is a voltage-to-pulse length converter 22 adjustable by means of the potentiometer 24 so as to define an inhibit period corresponding to the half-period of the shortest waveform to be received, that is to say to the limit of the upper side-band. The inhibiting signal $P_2$ is initiated at the commencement of the square waveform by a signal applied to the converter 22 from the Schmitt trigger 16 by way of the line 26. At the termination of the inhibiting signal, clock pulses $P_3$ (see FIG. 2) pass through the gate and are counted by the binary counter 28. Connections from the various stages of the binary counter extend to "AND" gates 30, 32 and 34, these connections being selected in accordance with the counts which define the mark level, the centre frequency level and the space level. The three gates 30, 32 and 34 thus decode the count and a signal appears at the output of one of them. Signals at the outputs of gates 30, 32 and 34 operate, respectively, a mark bistable circuit 36 (for a count corresponding to the upper side-band), a centre bistable circuit 38 (for a count corresponding to the centre frequency), and a space bistable circuit 40 (for a count corresponding to the lower side-band).

The signal $P_1$ from the Schmitt trigger circuit 16 is also applied through a circuit 42 to create a slightly delayed strobe pulse for application to the "AND" gates over line 44. The strobe pulse permits the "AND" gate which corresponds to the count to pass a signal to its bistable circuit 36, 38 or 40, once the count has been completed (see also FIG. 2). A delayed and inverted output $P_1$ is also taken from the circuit 42 to the counter 28 as a resetting pulse.

A resetting pulse derived from the output $P_2$ of circuit 22 is applied to the mark, centre and space circuits 36, 38 and 40 by way of line 46. In some cases this resetting pulse is not necessary. A change in the output of the counter then automatically resets the previously energised one of the circuits 36, 38 and 40.

A connection 48 from the last stage of the binary counter to the circuit 18 inhibits the latter if the counter s filled by the incoming pulses. This prevents the counter from restarting from zero after being filled by a train of clock pulses, which would otherwise lead to a false count representing only the overflow.

Thus, if the time duration of a half-cycle of a waveform coming into the receiver is too short (i.e. frequency too high), the voltage-to-pulse length converter will completely blank it and no clock pulses will be received by the binary counter. Similarly, if the duration of the half-cycle of incoming waveform is too long, more than the preset maximum will be received by the binary counter and this again inhibits a response. Thus, a digital filter is provided with an infinite cut-off characteristic and filter in the early stage is required merely to eliminate noise.

To convert the device for working at a different centre frequency, it is merely necessary to re-adjust the inhibiting pulse length and the clock frequency (this avoids changing the discriminator count levels).

I claim:

1. Apparatus for receiving and decoding signals frequency-modulated with pulsed data, comprising:

an input circuit having a bandwidth which, when centred on a predetermined carrier frequency, accommodates sidebands on each side of said frequency;

a clock pulse generator;

a counter;

gating means connected between said clock pulse generator and said counter for determining the period for which said counter receives pulses from said clock pulse generator;

enabling means coupled to said gating means and responsive to a recognizable point in the commencement of a half cycle or cycle of that input waveform to enable said counter to receive pulses from said clock pulse generator for a period between two of the said recognizable points in the input waveform;

inhibiting means coupled to said gating means so as to override the action of said enabling means and responsive to the said recognizable point in the input waveform to generate a single inhibiting waveform of a predetermined duration shorter than the period between successive recognizable points in the input waveform for preventing the application of pulses from the clock pulse generator to the counter for the duration of the said inhibiting waveform; and discriminating means preset to indicate a mark frequency, a centre frequency or a space frequency in accordance with the resulting count during the said half cycle or cycle.

2. Apparatus in accordance with claim 1, including a circuit for deriving a square waveform from the input waveform, said enabling circuit being responsive to the commencement and termination of the said square waveform and said inhibiting means to the commencement of the square waveform.

3. Apparatus in accordance with claim 2, in which said inhibiting means is a voltage-to-pulse length decoder, said apparatus including a manually adjustable source of voltage connected to control the input of said decoder.

4. Apparatus in accordance with claim 1, in which said counter has an overflow connection applying an inhibiting voltage to the said gating means to prevent the passage of further pulses when said counter has been completely filled.

References Cited

UNITED STATES PATENTS

| | | | |
|---|---|---|---|
| 2,882,338 | 4/1959 | Wozencraft | 178—69 |
| 3,222,454 | 12/1965 | Losee | 178—88 |
| 3,230,457 | 1/1966 | Soffel | 325—320 |
| 3,413,556 | 12/1966 | King | 325—320 |

ROBERT L. GRIFFIN, Primary Examiner

B. V. SAFOUREK, Assistant Examiner

U.S. Cl. X.R.

178—88; 328—136